(No Model.) 2 Sheets—Sheet 1.
E. B. V. SEAVERNS.
CONTROLLER FOR ALTERNATING CURRENT MACHINES.
No. 521,867. Patented June 26, 1894.
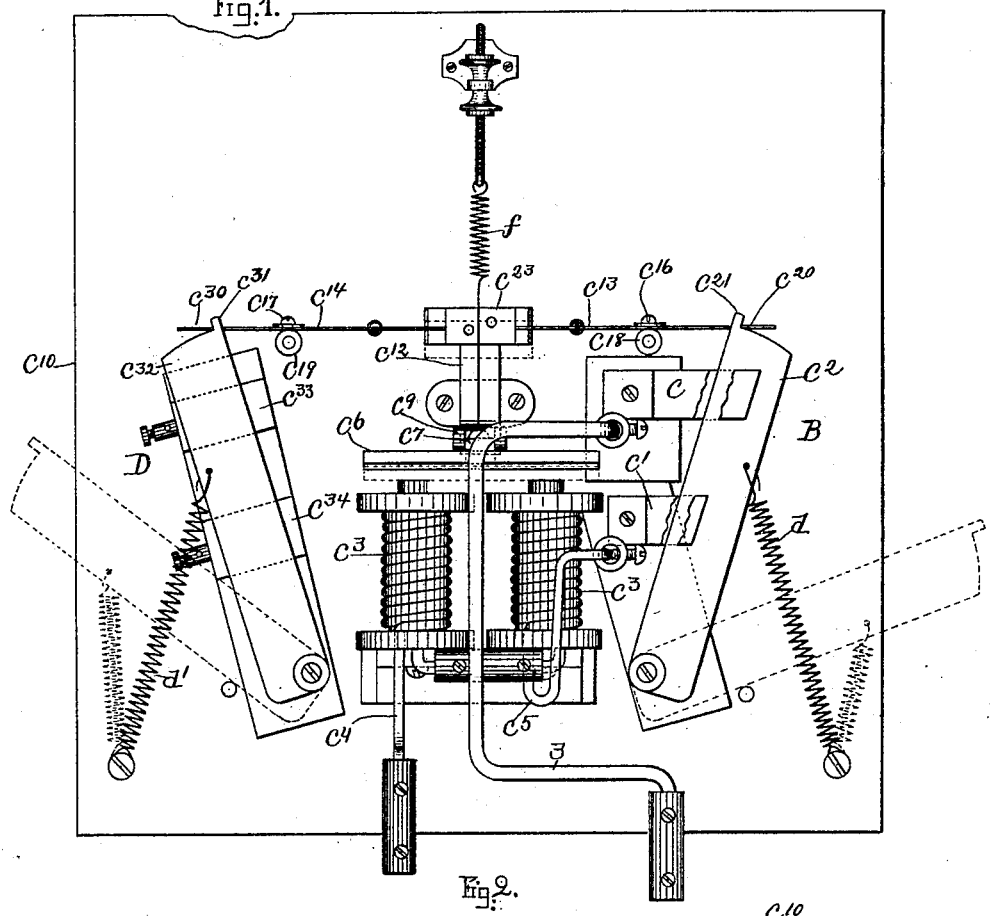
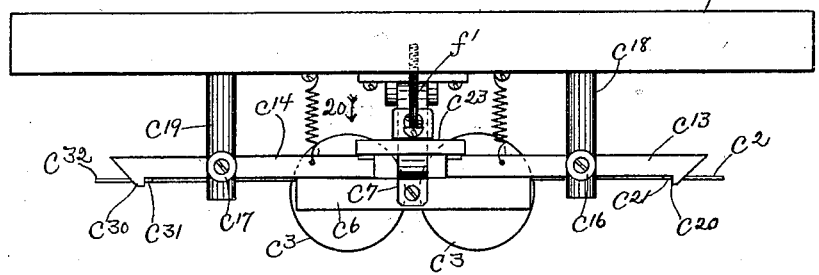
Witnesses.
Inventor.
Edmund B. V. Seaverns
By Jas. H. Churchill
Atty.

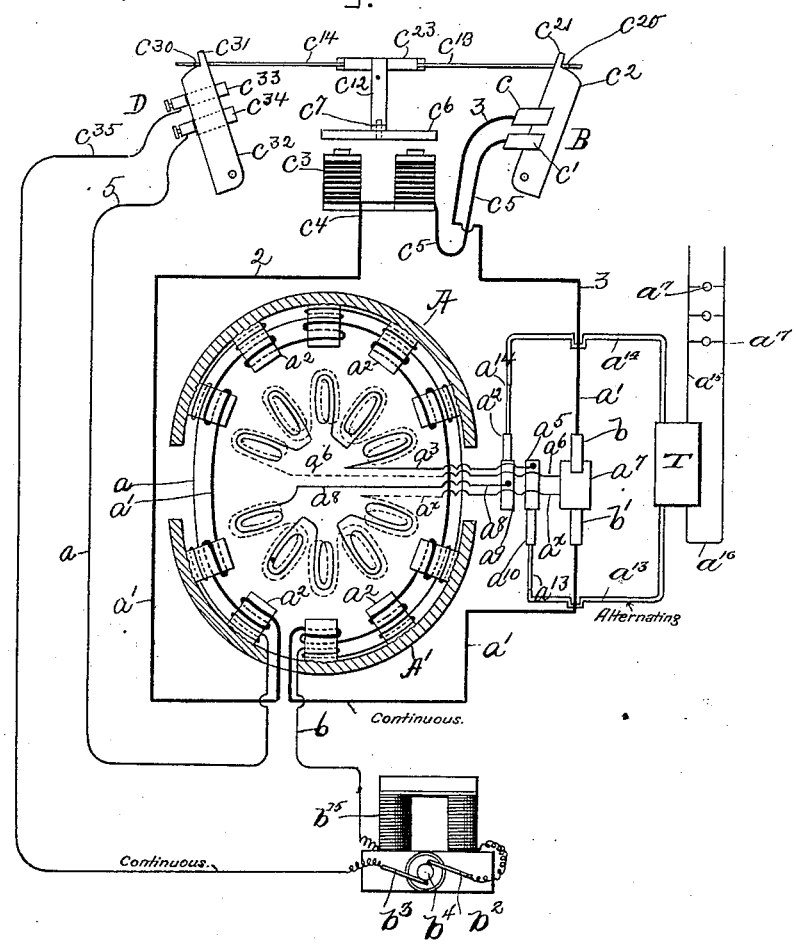

UNITED STATES PATENT OFFICE.

EDMUND B. V. SEAVERNS, OF BROOKLINE, MASSACHUSETTS.

CONTROLLER FOR ALTERNATING-CURRENT MACHINES.

SPECIFICATION forming part of Letters Patent No. 521,867, dated June 26, 1894.

Application filed March 29, 1893. Serial No. 468,125. (No model.)

*To all whom it may concern:*

Be it known that I, EDMUND B. V. SEAVERNS, residing in Brookline, in the county of Norfolk and State of Massachusetts, have invented an Improvement in Controllers for Alternating-Current Machines, of which the following description, in connection with the accompanying drawings, is a specification, like letters and figures on the drawings representing like parts.

This invention relates to a novel apparatus for controlling the operation of alternating current machines.

My present invention is especially adapted to control the operation of alternating current dynamos having a composite field, composed of two windings or sets of coils, one winding or set of coils being connected to a second dynamo, commonly called an exciter, and the other winding or set of coils being connected to the main circuit or line wires, as will be described. The main circuit or line wires referred to, are traversed by an alternating current generated by the machine, while both windings of the field magnets are traversed by continuous currents, one such current being generated by the exciter, and the other current being made by transforming the alternating current into a continuous current by means of a commutator.

As now commonly practiced, compound alternating current machines, such as above described, are controlled by means of a manually operated switch or circuit controller in the main circuit or line wires traversed by the alternating current, and also by a manually operated switch included in the exciter circuit. In practice, it frequently happens that a short circuit occurs upon the main line circuit, and in such an emergency, it is necessary to stop the generation of current. This is effected as now commonly practiced by first opening the exciter circuit, and after waiting a sufficient length of time to allow the voltage of the alternator to drop sufficiently to permit the main line switch to be opened with some degree of safety, the said main line switch is opened, for if the main line, which is traversed by the alternating current, should be first opened, the operator is exposed to great danger, on account of a stream of fire produced by the high voltage alternating current following the switch as it is opened, and also on account of the liability of the station being set on fire. To avoid these dangers, the exciter circuit is first opened, and after waiting a short time for the voltage of the alternator to drop, the operator then opens the main line switch. The time consumed between the opening of the exciter circuit and the main line circuit, is attended with danger on account of the liability of the armature of the alternator being burned out or bursting under strain, or of the belt breaking or slipping off from its pulley, which might result in serious damage to the engine driving the alternator.

It is the object of this invention to control the operation of alternating current machines, so that, in case of a short circuit on the circuit traversed by the alternating current, the alternator may be stopped generating substantially in an instant, without any of the dangers above referred to, and I accomplish my object by opening the circuit traversed by the continuous current, which is preferably automatically accomplished, by utilizing the extra current built up in the winding or circuit traversed by the continuous current, to operate an electro-magnet governing the operation of a switch or circuit controller, and thereby render the alternator devoid of current in its field magnets, and consequently render the generator inoperative, so that, the main line circuit may be opened without danger.

In accordance with my invention, the compound field winding of the alternator, which is traversed by a continuous current, has included in it, a circuit controller or switch, and preferably an electro-magnet normally inactive when the alternator is working under substantially its normal current, but which is responsive to or is rendered active by a substantially large increase in current, such as would be occasioned by a short circuit on the main line traversed by the alternating current, to automatically operate the said switch or circuit controller to open the compound winding and thereby stop the generation of current. The electro-magnet referred to, may and preferably will also govern the operation of a circuit controller or switch in the exciter circuit.

The particular features in which my invention consists will be pointed out in the claims at the end of this specification.

Figure 1, is an elevation of one form of apparatus with which to practice my invention; Fig. 2, a detail in plan view of a portion of the apparatus shown in Fig. 1, to enable the operation to be more readily understood, and Fig. 3, a diagram of circuits illustrating the application of my invention to an alternating current generator.

Referring to Fig. 3, A A′ represent the field magnets of an alternating current generator, the said field magnets being provided, as herein shown, with a compound winding, consisting of a winding of fine wire $a$ and a winding of larger or coarser wire $a'$, the said wires being wound upon the pole pieces $a^2$ of the field magnets to form poles of alternating polarity. The armature of the alternating current generator is herein shown as divided into two halves or sections alternately wound in opposite directions to correspond to the winding of the field magnets, one half of the armature winding having one end $a^3$ of its coil connected, as herein shown, to a copper ring $a^5$, which, in practice, is mounted upon the armature shaft, the other end $a^6$ of the armature coil being connected to alternate segments of a commutator $a^7$. One end $a^8$ of the other half of the armature coil is connected to a second copper ring $a^9$ mounted upon the armature shaft, and the other end $a^\times$ of the second half of the armature coil is connected to the other half of the commutator $a^7$. The copper rings $a^5$ $a^9$, commonly called collectors, have co-operating with them brushes $a^{10}$ $a^{12}$, to which the main circuit or line wires $a^{13}$ $a^{14}$ are connected, the said wires being represented in Fig. 3 as connected to one winding of a transformer T of any usual or suitable construction, the other winding of which has connected to it the circuit wires $a^{15}$ $a^{16}$ containing the translating devices, represented as incandescent lamps $a^{17}$ connected in multiple to the wires $a^{15}$ $a^{16}$. The coarse winding $a'$ of the field magnets has its opposite ends connected, as will be described, to brushes $b$ $b'$ co-operating with the commutator $a^7$, while the fine wire-winding $a$ has its ends connected in circuit with the brushes $b^2 b^3$ co-operating with the commutator $b^4$ of a second generator or dynamo, commonly called an exciter $b^{15}$, the said exciter being represented in Fig. 3 as a series wound dynamo, one end 6 of the fine winding $a$ being joined to the field magnet coil of the exciter $b^{15}$ and the other end of said coil being joined to the brush $b^2$.

The compound alternating current generator, as thus far described, is and may be of any usual or well-known construction, such as now commonly used in electric light stations. The alternating current generated in the machine is, by means of the commutator $a^7$, converted into a continuous current, which flows through the coarse winding $a'$ of the field magnets of the alternator, and after passing through the field magnets is reconverted by the commutator into an alternating current and passes to the line wires $a^{13}$ $a^{14}$ as an alternating current which induces an alternating current in the wires $a^{15}$ $a^{16}$. It will thus be seen that the coarse winding $a'$ of the compound alternator, which is traversed by a continuous current, is in series with the main line wires $a^{13}$ $a^{14}$, which are traversed by an alternating current.

To enable the alternator to be rendered inoperative in case of a short circuit on the main line wires $a^{13}$ $a^{14}$, I have interposed in the compound field winding $a'$ a switch B, which may be of any usual or well-known construction, but preferably a double pole switch consisting of two poles or terminals $c$ $c'$ and a co-operating member $c^2$, each of the poles $c$ $c'$ being preferably made bifurcated, so that the co-operating member $c^2$ may be inserted between the bifurcations to afford a better and more reliable contact. The member $c^2$ of the switch constitutes the movable member, and I prefer to automatically operate the same by means of the extra current flowing through the compound winding, when a short circuit occurs on the main line wires $a^{13}$ $a^{14}$. To accomplish this, an electro-magnet $c^3$ provided with a substantially coarse winding of substantially the same gage of wire as the compound winding, is tapped into or included in the circuit of the coarse winding $a'$. As represented in Fig. 3, one end $c^4$ of the coil of the said electro-magnet is joined to one portion 2 of the field winding $a'$, and the other end $c^5$ of the said coil, as herein shown, is connected to one pole, as $c'$, of the switch B, the other pole $c$ of which has connected to it the other portion 3 of the circuit of the field winding $a'$.

The electro-magnet $c^3$ has co-operating with it an armature $c^6$, herein shown as secured to one arm $c^7$ of an elbow lever pivoted in suitable lugs or ears $c^9$ secured to a suitable support $c^{10}$. The elbow lever referred to, has its other arm $c^{12}$ co-operating, as herein shown, with releasing or detent levers $c^{13}$, $c^{14}$, pivoted, as at $c^{16}$ $c^{17}$, to suitable studs or posts $c^{18}$ $c^{19}$ projecting from the support $c^{10}$. The detent lever $c^{13}$ is provided, as shown, with a hooked end $c^{20}$ adapted to engage a finger or projection $c^{21}$ on the movable member of the switch B, to normally hold the said member in engagement with the poles $c$ $c'$, and thereby maintain the circuit of the field winding $a'$ intact, while the generator is running under substantially normal conditions. As herein represented, the arm $c^{12}$ of the elbow lever referred to, is provided with a cross-bar $c^{23}$, which is adapted to engage the free ends of the levers $c^{13}$ $c^{14}$, when the armature $c^6$ is attracted. The lever $c^{14}$, as herein represented, is also provided with a notched end $c^{30}$, which engages a finger or projection $c^{31}$ on the movable member $c^{32}$ of a switch D, the said movable member co-operating, as shown, with two poles or terminals $c^{33}$, $c^{34}$ of the said switch. The switch D is included in the exciter circuit, that is, the circuit including the fine winding $a$ of the alternator, one pole, as $c^{33}$, being connected by the wire $c^{35}$ to the commutator brush $b^3$, and the other pole $c^{34}$ being connected to one portion 5 of the winding $a$, and the other portion 6 of the winding $a$ being joined to the commutator brush $b^2$ as above described.

The operation of the apparatus herein shown is as follows, viz:—When a short circuit occurs on the main line wires traversed by the alternating current, the continuous current flowing through the compound field or winding $a'$, is rapidly increased, and when the continuous current has increased a predetermined amount above the normal, the electro-magnet $c^3$ is energized sufficiently to attract its armature $c^6$, thereby rocking the elbow lever connected to it, and moving the cross-bar $c^{23}$ forward or in the direction indicated by arrow 20, Fig. 2, so as to turn the detent levers $c^{13}$ $c^{14}$ on their pivots, and withdraw their hooked ends $c^{20}$ $c^{30}$ from engagement with the fingers or projections $c^{21}$ $c^{31}$ on the movable members $c^2$ $c^{32}$ of the switches B, D, permitting the said movable members to be withdrawn from engagement with their co-operating poles or terminals, which may be accomplished by the springs $d$ $d'$ or in any other equivalent manner as by means of weights. When the movable member $c^2$ is disengaged from its co-operating poles, the field winding $a'$ traversed by the continuous current is opened, and in a compound alternator, such as herein described and shown, the circuit traversed by the alternating current is also opened at the switch B, the field winding $a'$ being in series with the main lines. When the movable member $c^{32}$ of the switch D is withdrawn from its co-operating poles, the circuit of the field winding $a$ forming part of the exciter circuit, is opened, and the exciter rendered inoperative. After the switch B has been opened, the main line switch, not herein shown, may be opened with safety, and a test may then be made to see if the short circuit is temporary or permanent, by again closing the switch B and then closing the main line switch, and if the short circuit remains, the electro-magnet $c^3$ will be again energized and open the switch B.

I have herein shown one form of switch and apparatus for operating it, but I do not desire to limit my invention to any particular form or construction of apparatus. So also, I prefer to operate both the switch B and also the switch D automatically, but it is evident that either switch may be positively operated, as by hand, on account of the continuous nature of the current flowing through the circuit of which the switch forms a part. Furthermore, the switch B may be automatically operated and the switch D positively operated, but I prefer that both be automatically operated, as all danger of injury to the operator or to the machine is avoided.

It will be noticed that the electro-magnet $c^3$ included in the field circuit of the alternator, which field circuit is traversed by a continuous current, may also be used to great advantage to automatically operate the exciter switch D, even when used without the switch B, for with the exciter switch operated automatically, it will be seen that the voltage of the machine will be lowered much sooner than when the operator is depended upon to operate the exciter switch, for as now practiced, the operator may be at a considerable distance from his machine and not know of the short circuit until notified by the accident to the machine.

The armature $a^6$ is provided, as shown in Fig. 1, with the usual retractor or spring $f$ and back stop $f'$, the latter being shown in Fig. 2 as a screw inserted into the support $c^{10}$.

I have represented the exciter $b^{15}$ as a series wound dynamo, but it is evident that this machine may be of any other usual type such as a shunt wound machine.

I claim—

1. The combination with an alternating current machine having a composite field, one winding of which is traversed by a continuous current and is in series circuit with the main line traversed by the alternating current, of a switch or circuit controller included in the said field winding traversed by the continuous current, substantially as described.

2. The combination with an alternating current machine having a composite field, one winding of which is traversed by a continuous current and is in series circuit with the main line traversed by the alternating current, of a switch or circuit controller included in the said field winding traversed by the continuous current, and an electro-magnet also included in the said field winding traversed by the continuous current and automatically operated by an increase in current to actuate the said switch or circuit, controller, substantially as described.

3. The combination with an alternating current machine having a composite field consisting of one winding included in circuit with a second machine or exciter, and the other winding traversed by a continuous current being included in series circuit with the main line, traversed by an alternating current, of switches or circuit controllers included in the said field windings, and an electro-magnet included in the circuit of the second field winding and automatically operated by an increase in current to actuate the said switches, substantially as described.

4. The combination with an alternating current machine having its field magnets traversed by a continuous current, of a switch or circuit controller included in the circuit traversed by the continuous current, and an electro-magnet also included in the circuit traversed by the continuous current and energized by a short circuiting of the circuit traversed by the alternating current to automatically operate the said switch or circuit controller to open the circuit traversed by the continuous current, substantially as described.

5. The combination with an alternating current machine having a composite field, one winding of which is traversed by a continuous current and in series circuit with the main line traversed by the alternating current, and the other winding included in circuit with a second machine or exciter, of a switch or circuit controller in said exciter circuit, and an electro-magnet in the field winding traversed by the continuous current and in circuit with the line wires and operated by a predetermined increase in current in the said winding to automatically operate the switch in the exciter circuit, substantially as described.

In testimony whereof I have signed my name to this specification in the presence of two subscribing witnesses.

EDMUND B. V. SEAVERNS.

Witnesses:
JAS. H. CHURCHILL,
J. MURPHY.